United States Patent
Wang (10) Patent No.: US 12,342,326 B2
(45) Date of Patent: Jun. 24, 2025

(54) METHOD FOR TRANSMITTING APERIODIC SRS AND RELATED DEVICES

(71) Applicant: BEIJING UNISOC COMMUNICATIONS TECHNOLOGY CO., LTD., Beijing (CN)

(72) Inventor: Hualei Wang, Beijing (CN)

(73) Assignee: BEIJING UNISOC COMMUNICATIONS TECHNOLOGY CO., LTD., Beijing (CN)

(*) Notice: Subject to any disclaimer, the term of this patent is extended or adjusted under 35 U.S.C. 154(b) by 394 days.

(21) Appl. No.: 17/791,891

(22) PCT Filed: Feb. 25, 2021

(86) PCT No.: PCT/CN2021/077771
§ 371 (c)(1),
(2) Date: Jul. 9, 2022

(87) PCT Pub. No.: WO2021/139832
PCT Pub. Date: Jul. 15, 2021

(65) Prior Publication Data
US 2023/0043745 A1    Feb. 9, 2023

(30) Foreign Application Priority Data
Jan. 10, 2020 (CN) .......................... 202010029818.1

(51) Int. Cl.
*H04W 72/0446* (2023.01)
*H04L 5/00* (2006.01)

(52) U.S. Cl.
CPC ....... *H04W 72/0446* (2013.01); *H04L 5/0051* (2013.01)

(58) Field of Classification Search
CPC .............. H04W 72/0446; H04W 72/20; H04L 5/0051; H04L 5/0007; H04L 5/0094; H04L 5/0048
See application file for complete search history.

(56) References Cited

U.S. PATENT DOCUMENTS

2019/0149365 A1    5/2019   Chatterjee et al.
2019/0174466 A1    6/2019   Zhang et al.
(Continued)

FOREIGN PATENT DOCUMENTS

CN    102104973 A    6/2011
CN    102694637 A    9/2012
(Continued)

OTHER PUBLICATIONS

SONY; "Summary of SRS"; 3GPP TSG RAN WG1 Meeting #92; R1-1803244, Feb. 27, 2018, 29 Pages.
(Continued)

*Primary Examiner* — Tejis Daya
(74) *Attorney, Agent, or Firm* — HAUPTMAN HAM, LLP (57) ABSTRACT

A method for transmitting an aperiodic sounding reference signal (SRS) and related devices are disclosed in implementations of the disclosure. The method includes: receiving, by a terminal device, a first control instruction for triggering the terminal device to transmit the aperiodic SRS, the first control instruction containing a first parameter field and SRS resource set information, the first parameter field containing a first slot offset; and determining, by the terminal device, a time-domain location for transmitting the aperiodic SRS according to the first slot offset, and transmitting the aperiodic SRS according to the time-domain location determined.

15 Claims, 3 Drawing Sheets

(56) References Cited

U.S. PATENT DOCUMENTS

| | | |
|---|---|---|
| 2019/0254061 A1 | 8/2019 | Manolakos et al. |
| 2019/0297603 A1* | 9/2019 | Guo .................. H04L 5/0053 |
| 2019/0356445 A1* | 11/2019 | Manolakos .......... H04B 7/0805 |
| 2021/0409178 A1* | 12/2021 | Faxér .................. H04W 72/23 |
| 2022/0116888 A1* | 4/2022 | Si ........................ H04L 5/0051 |
| 2022/0345195 A1* | 10/2022 | Jang .................... H04L 5/0094 |
| 2023/0179390 A1* | 6/2023 | Ibrahim ............... H04L 5/0053 |
| | | 370/278 |

FOREIGN PATENT DOCUMENTS

| | | |
|---|---|---|
| CN | 103314631 A | 9/2013 |
| CN | 109842472 A | 6/2019 |
| CN | 110324124 A | 10/2019 |
| CN | 110460416 A | 11/2019 |
| CN | 110650001 A | 1/2020 |
| CN | 111226476 A | 6/2020 |
| EP | 4047850 A1 | 8/2022 |
| WO | 2019140666 A1 | 7/2019 |
| WO | 2019147045 A1 | 8/2019 |
| WO | 2020084362 A1 | 4/2020 |

OTHER PUBLICATIONS

Extended European search report issued for EP application No. 21738219.1 mailed on Jan. 25, 2024, 12 Pages.
WIPO, International Search Report and Written Opinion for International Application No. PCT/CN2021/077771, May 19, 2021.
Ericsson, R1-1813250, CR1-38214 7.1.2.4 Correction to aperiodic SRS offset, 3GPP TSG RAN WG1 Meeting#95, Nov. 2, 2018.
The first office action issued in corresponding CN application No. 202010029818.1 dated Feb. 18, 2022.

* cited by examiner

FIG. 6

METHOD FOR TRANSMITTING APERIODIC SRS AND RELATED DEVICES

CROSS-REFERENCE TO RELATED APPLICATION(S)

This application is a National Stage of International Application No. PCT/CN2021/077771, filed on Feb. 25, 2021, which claims priority to Chinese Patent Application No. 202010029818.1, filed Jan. 10, 2020, the entire disclosures of which are hereby incorporated by reference.

TECHNICAL FIELD

This disclosure relates to the technical filed of communication, and in particular to a method for transmitting an aperiodic SRS and related devices.

BACKGROUND

Sounding reference signal (SRS) is a signal transmitted by a terminal device to an access network device such as a base station, which is used for the access network device to estimate uplink channel quality according to the SRS and then schedule transmission resources. In a long term evolution (LTE) system, there are two types of SRS in the time domain, that is, periodic SRS and aperiodic SRS. In a new radio (NR) access technology system, a semi-persistent SRS is newly introduced, so that there are three types of SRS in the time domain.

SRS can be transmitted on a certain SRS resource. An SRS resource is determined by multiple resource parameters configured through radio resource control (RRC). These resource parameters may include the number of antenna ports, the number of orthogonal frequency division multiplexed (OFDM) symbols, frequency-domain location, slot location, etc. Multiple SRS resources of the same type in the time domain may form an SRS resource set.

Transmission of the aperiodic SRS by the terminal device is triggered by downlink control information (DCI) transmitted from the access network device to the terminal device. For each of aperiodic-SRS resource sets, a corresponding slot offset unique to the aperiodic SRS resource set is configured through RRC. After the terminal device receives the DCI, the terminal device may obtain an SRS resource set triggered by the DCI and a slot offset in a corresponding RRC configuration, and determine a transmission slot for the aperiodic SRS. In this manner, the terminal device can only determine the transmission slot for the aperiodic SRS according to the fixed slot offset in the RRC configuration for the SRS resource set. In other words, after RRC configuration, the slot offset for any terminal device to transmit the aperiodic SRS based on the SRS resource set is fixed and consistent. This manner of determining the SRS transmission slot lacks diversification.

SUMMARY

In a first aspect, implementations of the disclosure provide a method for transmitting an aperiodic SRS. The method includes: receiving, by a terminal device, a first control instruction for triggering the terminal device to transmit the aperiodic SRS, the first control instruction containing a first parameter field and SRS resource set information, the first parameter field containing a first slot offset; and determining, by the terminal device, a time-domain location for transmitting the aperiodic SRS according to the first slot offset, and transmitting the aperiodic SRS according to the time-domain location determined.

In a second aspect, implementations of the disclosure provide a terminal device. The terminal device may include a transceiver, a processor, and a memory. The processor is coupled with the memory and the processor. The memory is configured to store program codes. The terminal device is configured to invoke the program codes to perform the method in the first aspect or implementations thereof.

In a third aspect, implementations of the disclosure provide a non-transitory computer storage medium. The non-transitory computer storage medium stores a computer program. The computer program is executable by a terminal device to perform the method of any aspect above.

DETAILED DESCRIPTION

The technical solutions in implementations of the disclosure will be clearly and completely described below with reference to the drawings in the implementations of the disclosure. Obviously, the described implementations are only a part but not all of the implementations of the disclosure. Based on the implementations of the disclosure, all other implementations obtained by those of ordinary skill in the art without creative efforts shall fall within the protection scope of the disclosure.

Figure 1:
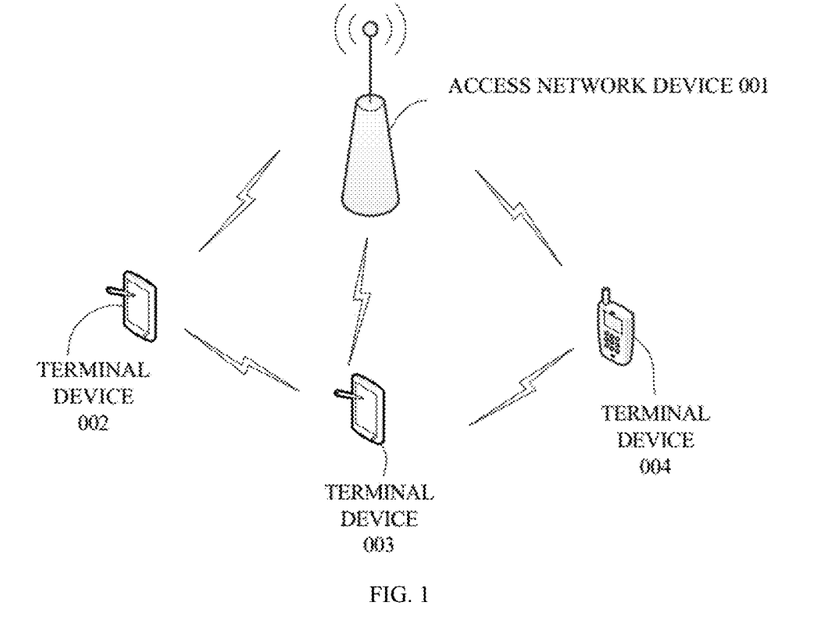
FIG. 1 is a schematic structural diagram of a system for transmitting an aperiodic SRS provided in implementations of the disclosure.

First, a system architecture is introduced. Referring to FIG. 1, FIG. 1 is a schematic structural diagram of a system for transmitting an aperiodic sounding reference signal (SRS) provided in implementations of the disclosure. As shown in FIG. 1, the system may include an access network device 001 and at least one terminal device. Terminal device 002, terminal device 003 and terminal device 004 are exemplarily illustrated in FIG. 1.

The access network device 001 may include various forms of network devices, such as a macro base station, a micro base station (also referred to as a small cell), a relay station, an access point, a Cell, and the like. Exemplary base stations may include evolutional node B (eNB), and next-generation Node B (gNB) in 5G system and new radio system. In addition, the base station may also include a transmission receive point (TRP), a central unit (CU), or other network entities. In addition, in a distributed base station scenario, the access network device 001 may be a baseband unit (BBU) and a remote radio unit (RRU). In a cloud radio access network (CRAN) scenario, the access network device 001 may be a baseband pool (BBU pool) and a radio frequency unit (RRU). In addition, the access network device 001 may also be a mobility management entity (MME) device, an access and mobility management function (AMF) device, a V2X control function (CF) device, a gateway (GateWay), a roadside unit (RSU), an operation administration and maintenance (OAM) device, an application server (APP server), or a third-party network element.

The terminal device may also be referred to as user equipment, mobile station, access terminal, subscriber unit, subscriber station, mobile station, remote station, remote terminal, mobile device, user terminal, terminal, wireless communication device, user agent, or user equipment, and the like. The terminal device may be a handheld user equipment, a notebook computer, a subscriber unit, a cellular phone, a smart phone, a wireless data card, a personal digital assistant (PDA), a handheld device with wireless communication functions, an in-vehicle device, a wearable device, and a mobile station in the future 5G network or user equipment in a future evolved public land mobile network (PLMN) network, etc. A certain air interface technology is used for mutual communication between the terminal device and the access network device 001.

The terminal device 002, terminal device 003 and terminal device 004 may be terminal devices in a cell of the access network device 001. The access network device may transmit a first control instruction to any of the terminal devices for triggering the terminal device to transmit an aperiodic SRS. After the terminal device receives the first control instruction from the access network device 001, the terminal device determines a time-domain location for transmitting the aperiodic SRS according to a first slot offset carried in the first control instruction and then transmits the aperiodic SRS. In this way, flexibility and diversity of determining the transmission slot for the aperiodic SRS can be improved.

Figure 2:
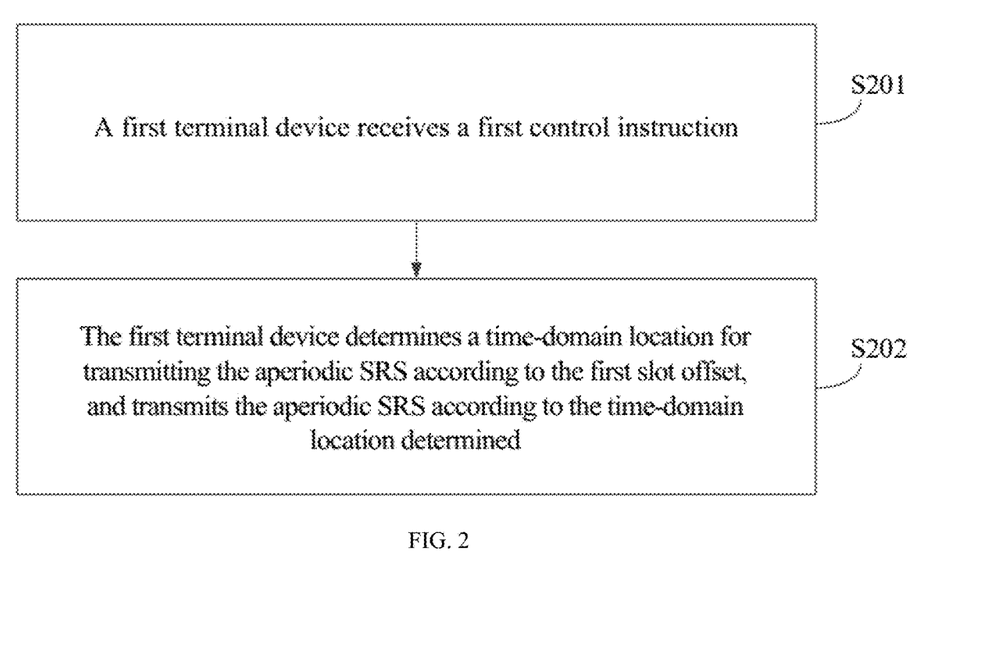
FIG. 2 is a schematic flowchart of a method for transmitting an aperiodic SRS provided in implementations of the disclosure.

The following describes a method for transmitting an aperiodic SRS provided in implementations of the disclosure. The method for transmitting an aperiodic SRS provided in implementations of the disclosure may be implemented based on the system architecture in FIG. 1. Referring to FIG. 2, FIG. 2 is a schematic flowchart of a method for transmitting an aperiodic SRS provided in implementations of the disclosure. As illustrated, the method may include operations at S201-S202.

At S201, a first terminal device receives a first control instruction.

The first instruction is used for triggering the first terminal device to transmit an aperiodic SRS. Optionally, the first control instruction may be downlink control information (DCI), where parameters carried in the DCI are in the form of fields in the DCI. For example, the DCI may contain an SRS request field, a time-domain resource allocation (TDRA) field, etc.

The first control instruction contains a first parameter field. The first parameter field contains a first slot offset. Optionally, the first control instruction explicitly indicates a slot offset for the first terminal device to transmit the aperiodic SRS. In this case, the first parameter field in the first control instruction may be a field that is dedicated to dynamically and flexibly indicate the slot offset for a user terminal to transmit the aperiodic SRS. In another implementation, the first control instruction implicitly indicates the slot offset for the first terminal device to transmit the aperiodic SRS. In this case, the first parameter field may be a TDRA field. A slot offset in the TDRA field may be used to indicate a slot offset of a physical uplink shared channel (PUSCH) or a physical downlink shared channel (PDSCH). Herein, the slot offset in the TDRA field is used to indicate the slot offset for transmitting the aperiodic SRS.

The first control instruction further contains SRS resource set information, which is indication information corresponding to the SRS resource set, indicating that the access network device triggers the first terminal device to transmit the aperiodic SRS on which one or more SRS resource sets. That is, the first terminal device can determine which SRS resource set is triggered according to the SRS resource set information in the first control instruction. Optionally, the SRS resource set information may be a parameter(s) in the SRS request field in the first control instruction, that is, different SRS resource sets may be triggered through different SRS request values.

Specifically, before S201, different SRS resource parameters may be configured through RRC, so as to define different SRS resource sets. Optionally, a fixed slot offset may be configured through RRC for each SRS resource set (that is, RRC-configured slot offset). The access network device may configure the SRS resource parameter(s) corresponding to the SRS resource set to the first terminal device for storing. The access network device may establish a correspondence between respective SRS resource sets and different aperiodic SRS-Resource Trigger values, and configure the correspondence to the first terminal device, such that the first terminal device can store the aperiodic SRS-Resource Trigger value corresponding to each SRS resource set. Then at S201, after obtaining an SRS request value contained in the first control instruction (i.e. SRS resource set information), the first terminal device determines an aperiodic SRS-Resource Trigger value corresponding to the SRS request value in the first control instruction, and determines a corresponding SRS resource set according to the correspondence stored. The first terminal device may further obtain the corresponding SRS resource parameter(s) which is subsequently used for transmitting the aperiodic SRS.

For instance, the access network device configures three SRS resource sets each corresponding to a different value of a higher-layer configuration parameter (aperiodic SRS-Resource Trigger value). The aperiodic SRS-Resource Trigger corresponding to each of the three SRS resource sets is configured to be 1, 2, or 3, respectively. The SRS request field occupies 2 bits in the DCI, where different values of the 2 bits represent different SRS resource set information. In an exemplarily implementation, SRS request of "00" corresponds to no aperiodic SRS resource set being triggered, SRS request of "00" corresponds to an SRS resource set with aperiodic SRS-Resource Trigger configured to be "1", SRS request of "10" corresponds to an SRS resource set with aperiodic SRS-Resource Trigger configured to be "2", and SRS request of "11" corresponds to an SRS resource set with aperiodic SRS-Resource Trigger configured to be "3". If the SRS request in the DCI has a value of "11", the first terminal device may determine that the access network device triggers the aperiodic SRS for the SRS resource set with aperiodic SRS-Resource Trigger configured to be "3", and may further obtain a corresponding SRS resource parameter for subsequent transmission of the aperiodic SRS. If the SRS request in the first control instruction has a value of "00", the first terminal device may determine that no aperiodic SRS resource set is triggered, and then may determine whether a condition for transmitting a periodic SRS or a semi-persistent SRS is satisfied according to other information.

At S202, the first terminal device determines a time-domain location for transmitting the aperiodic SRS according to the first slot offset, and transmits the aperiodic SRS according to the time-domain location determined.

In some implementations of the first terminal device determining the time-domain location for transmitting the aperiodic SRS according to the first slot offset, if the first terminal device receives the first control instruction in slot n and the first slot offset is k, the first terminal device determines that slot n+k is used for transmitting the aperiodic SRS. Further, the first terminal device determines a symbol(s) in slot n+k for transmitting the aperiodic SRS (that is, the time-domain location for transmitting the aperiodic SRS) according to a symbol location in the SRS resource parameter(s) corresponding to the SRS resource set information. The symbol location refers to a location of a symbol(s) for transmitting the aperiodic SRS in a slot (the slot for transmitting the aperiodic SRS) which is configured when the SRS resource is configured through RRC. In some implementations, the symbol location may be 1 consecutive symbols in last j symbols in the slot for transmitting the aperiodic SRS. For example, in NR, j may have a value of 6, and 1 may have a value of 1, 2, or 4. According to such symbol location, the symbol(s) for transmitting the aperiodic SRS in slot n+k can be determined. In addition, the first terminal device obtains a SRS resource parameter(s), such as the number of antenna ports, the number of OFDM symbols, and frequency-domain location, of the SRS resource set corresponding to the SRS resource set information in the first control instruction, and transmits the aperiodic SRS in slot n+k according to the SRS resource parameter(s).

In an optional implementation, before S201, the method further includes the following. The first terminal device may receive first enabling information, where the first enabling information is configured through RRC and is used for instructing the first terminal device to determine a time-domain location for transmitting the aperiodic SRS according to the first slot offset in the first parameter field. After receiving the first control instruction, the first terminal device obtains the first slot offset from the first parameter field according to the first enabling information, determines the time-domain location for transmitting the aperiodic SRS according to the first slot offset, and transmits the aperiodic SRS according to the time-domain location determined. In other words, if the first terminal device receives the first enabling information before receiving the first control instruction, the first terminal device obtains the slot offset for transmitting the aperiodic SRS from the first parameter field according to the first enabling information. Otherwise, the first terminal device will determine the slot offset for transmitting the aperiodic SRS according to the RRC configuration.

In another optional implementation, after S202, the method may further include the following. The first terminal device receives second enabling information, where the second enabling information is used for instructing the first terminal device to determine a time-domain location for transmitting the aperiodic SRS according to a RRC-configured slot offset. The first terminal device receives a second control instruction, where the second control instruction is used for triggering the first terminal device to transmit the aperiodic SRS, and the second control instruction contains fourth SRS resource set information. The first terminal device obtains an RRC-configured slot offset corresponding to the fourth SRS resource set information according to the second enabling information. The first terminal device determines a sixth time-domain location according to the RRC-configured slot offset corresponding to the fourth SRS resource set information, and transmits the aperiodic SRS according to the sixth time-domain location.

The above two optional implementations can be executed independently, or both can be executed in sequence. For example, after the first terminal device receives the first enabling information, the first terminal device determines the time-domain location for transmitting the aperiodic SRS according to the first slot offset in the first parameter field. After the first terminal device receives the second enabling information, the first terminal will determine the time-domain location for transmitting the aperiodic SRS, no longer according to the first slot offset in the first parameter field, but according to the RRC-configured slot offset instead. Until the first terminal device receives the first enabling information again, the first terminal will not determine the time-domain location for transmitting the aperiodic SRS according to the first slot offset in the first parameter field.

In other words, the first enabling information and the second enabling information cause the first terminal to determine the slot offset for transmitting the aperiodic SRS in different manners respectively. The second enabling information may be regarded as disabling information corresponding to the first enabling information. The first enabling information and the second enabling information may be in a same type configured through RRC, both containing same types of fields. These fields include a type of enabling field for instructing the first terminal device to determine the time-domain location for transmitting the aperiodic SRS according to either the first slot offset in the first parameter field or the RRC-configured slot offset. After the first terminal device receives the enabling information, the first terminal device can identify, according to different values of the enabling field, whether the received enabling information is the first enabling information that instructs to determine the time-domain location for transmitting the aperiodic SRS according to the first slot offset in the first parameter field, or the second enabling information that instructs to determine the time-domain location for transmitting the aperiodic SRS according to the RRC-configured slot offset. The first terminal device then determines the time-domain location for transmitting the aperiodic SRS and transmits the aperiodic SRS.

In another implementations of the first terminal device determining the time-domain location for transmitting the aperiodic SRS according to the first slot offset, the first enabling information may specifically instruct the first terminal device to determine the time-domain location for transmitting the aperiodic SRS according to both the first slot offset in the first parameter field and the RRC-configured slot offset. To illustrate, considering that the first terminal device receives the first enabling information before S202 and receives the first control instruction in slot s, the first slot offset is r, and the RRC-configured slot offset of the SRS resource set corresponding to the SRS resource set information in the first control instruction is t, then the first terminal device determines slot s+r+t to be the slot for transmitting the aperiodic SRS, and further determines a symbol(s) in slot s+r+t for transmitting the aperiodic SRS (that is, the time-domain location for transmitting the aperiodic SRS) according to a symbol location in the SRS resource parameter(s) corresponding to the SRS resource set information.

The SRS resource set information contained in the first control instruction may include SRS resource set information corresponding to one SRS resource set, or may include SRS resource set information corresponding to multiple SRS resource sets. For example, if there is one SRS resource set with aperiodic SRS-Resource Trigger configured to be "1", in a case that the SRS request in the first control instruction has a value of "01", the first control instruction contains only SRS resource set information corresponding to the SRS resource set. If there are multiple SRS resource sets with aperiodic SRS-Resource Trigger configured to be "2", in a case that the SRS request in the first control instruction has a value of "10", the first control instruction contains SRS resource set information corresponding to the multiple SRS resource sets.

In a first optional implementation, the SRS resource set information in the first control instruction contains first SRS resource set information corresponding to only one first SRS resource set. In this case, the first terminal device determines a first time-domain location according the first slot offset, and transmits the aperiodic SRS based on the SRS resource parameter(s) corresponding to the first SRS resource set according to the first time-domain location. Here, the first control instruction may be transmitted from the access network device to the first terminal device on condition that multiple SRS resource sets are unexpected or not allowed to be triggered simultaneously for the first terminal device, or on condition that multiple SRS resource sets are expected or allowed to be triggered simultaneously for the first terminal device, but the access network device only requires the first terminal device to transmit the aperiodic SRS based on one first SRS resource set.

In a second optional implementation, the SRS resource set information in the first control instruction includes multiple pieces of second SRS resource set information each corresponding to one of multiple second SRS resource sets. In this case, the first terminal device may ignore the first slot offset indicated by the first control instruction and transmits the aperiodic SRS according to an RRC-configured slot offset corresponding to each second SRS resource set. Therefore, for each of the multiple second SRS resource sets, the method further includes the following. The first terminal device obtains an RRC-configured slot offset corresponding to the second SRS resource set according to the second SRS resource set information, determines a second time-domain location corresponding to the second SRS resource set according to the RRC-configured slot offset corresponding to the second SRS resource set, and transmits the aperiodic SRS at the second time-domain location according to the SRS resource parameter(s) corresponding to the second SRS resource set.

In a third optional implementation, the SRS resource set information in the first control instruction includes multiple pieces of third SRS resource set information each corresponding to one of multiple third SRS resource sets. The first terminal device may select a specified third SRS resource set from the multiple third SRS resource sets, determines a third time-domain location according to the first slot offset, and transmits the aperiodic SRS according to the SRS resource set parameter(s) corresponding to the specified third SRS resource set based on the specified third SRS resource set. The specified third SRS resource set may be determined in various manners. For example, a third SRS resource set with a minimum resource-set-identifier (ID) in the multiple third SRS resource sets is determined as the specified third SRS resource set. For another example, a third SRS resource set with a maximum resource-set-ID in the multiple third SRS resource sets is determined as the specified third SRS resource set. Optionally, multiple specified third SRS resource sets may be determined, and the aperiodic SRS may be transmitted according to the first slot offset. The specified third SRS resource set may be determined in various manners, which are not limited herein. However, regardless of the specific determination manners, each terminal device within coverage of the access network device shall determine the specified third SRS resource set in a same agreed determination manner.

In connection with the third optional implementation, further optionally, the first terminal device would not transmit the aperiodic SRS based on other third SRS resource sets than the specified third SRS resource set.

In connection with the third optional implementation, further optionally, the first terminal device would also transmit the aperiodic SRS based on other third SRS resource sets in addition to the specified third SRS resource set. Specifically, the method may further include the following. For each of the multiple third SRS resource sets other than the specified third SRS resource set, the first terminal device may obtain a RRC-configured slot offset corresponding to the third SRS resource set according to the third SRS resource set information, determine a fourth time-domain location corresponding to the third SRS resource set according to the RRC-configured slot offset corresponding to the third SRS resource set, and transmits the aperiodic SRS according to the fourth time-domain location based on the third SRS resource set.

In a fourth optional implementation, the SRS resource set information in the first control instruction includes multiple pieces of fifth SRS resource set information each corresponding to one of multiple fifth SRS resource sets. The first terminal device may ignore the first control instruction and do not transmit the aperiodic SRS based on any fifth SRS resource set.

In a fifth optional implementation, the first control instruction may be transmitted from the access network device to the first terminal device on condition that triggering of multiple SRS resource sets is not expected by or not allowed for the first terminal, while the SRS resource set information in the first control instruction contains multiple pieces of sixth SRS resource set information each corresponding to one of multiple sixth SRS resource sets. In this case, the first terminal determines that an error event occurs and do not transmit the aperiodic SRS.

It should be noted that, for the second optional implementation, the third optional implementation (including further optional implementations in connection with the third optional implementation), the fourth optional implementation, and the fifth optional implementation, the first control instruction contains multiple pieces of SRS resource set information, and the first terminal device may operate in a pre-configured mode (that is, the pre-configured mode is one of the second optional implementation, the third optional implementation, the fourth optional implementation, or the fifth optional implementation). In another possible implementation, the first control instruction may further contain third enabling information for instructing the first terminal device to operate in which mode on condition that the first control instruction contains multiple pieces of SRS resource set information, so that the first terminal device may operate in the mode as instructed by the third enabling information. Optionally, the third enabling information may be the same enabling information as the first or second enabling information.

Optionally, if no slot offset is pre-configured through RRC for the SRS resource set, the slot offset for transmitting the aperiodic SRS may be implicitly indicated to the first terminal device through the first control instruction, that is, the first parameter field is a TDRA field. In this case, if the SRS resource set information in the first control instruction contains only SRS resource set information corresponding to one SRS resource, the aperiodic SRS will be transmitted according to the slot offset in the TDRA field implicitly indicated by the first control instruction. If the SRS resource set information in the first control instruction contains multiple pieces of SRS resource set information corresponding to multiple SRS resources, which means that multiple SRS resource sets are triggered, in one example, the first terminal device may determine a specified SRS resource set (such as the SRS resource set with a small resource-set-ID) from the multiple SRS resource sets, and transmit the aperiodic SRS based on the specified SRS resource set according to the slot offset in the TDRA field implicitly indicated by the first control instruction, but not transmit the aperiodic SRS based on any other SRS resource set. In another example, if the SRS resource set information in the first control instruction contains multiple pieces of SRS resource set information corresponding to multiple SRS resources, the first terminal device may ignore the first control instruction and do not transmit the aperiodic SRS. In another implementation, if the first control instruction is transmitted from the access network device to the first terminal device on condition that triggering of multiple SRS resource sets is not expected by or not allowed for the first terminal device, while the SRS resource set information in the first control instruction contains multiple pieces of SRS resource set information each corresponding to one of multiple SRS resource sets, the first terminal device determines that an error event occurs and do not transmit the aperiodic SRS.

In implementations of the disclosure, the first terminal device receives a first control instruction for triggering the first terminal device to transmit the aperiodic SRS. The first control instruction contains a first parameter field and SRS resource set information, and the first parameter field contains a first slot offset. The first terminal device determines a time-domain location for transmitting the aperiodic SRS according to the first slot offset, and transmits the aperiodic SRS according to the time-domain location determined. Through the first slot offset carried in the first control instruction, the time slot offset for the first terminal device to transmit the aperiodic SRS can be dynamically indicated, and then the time-domain location for transmitting the aperiodic SRS can be determined according to the dynamically-indicated slot offset, which improves the flexibility and diversity of determining the transmission slot for the aperiodic SRS.

Figure 3:
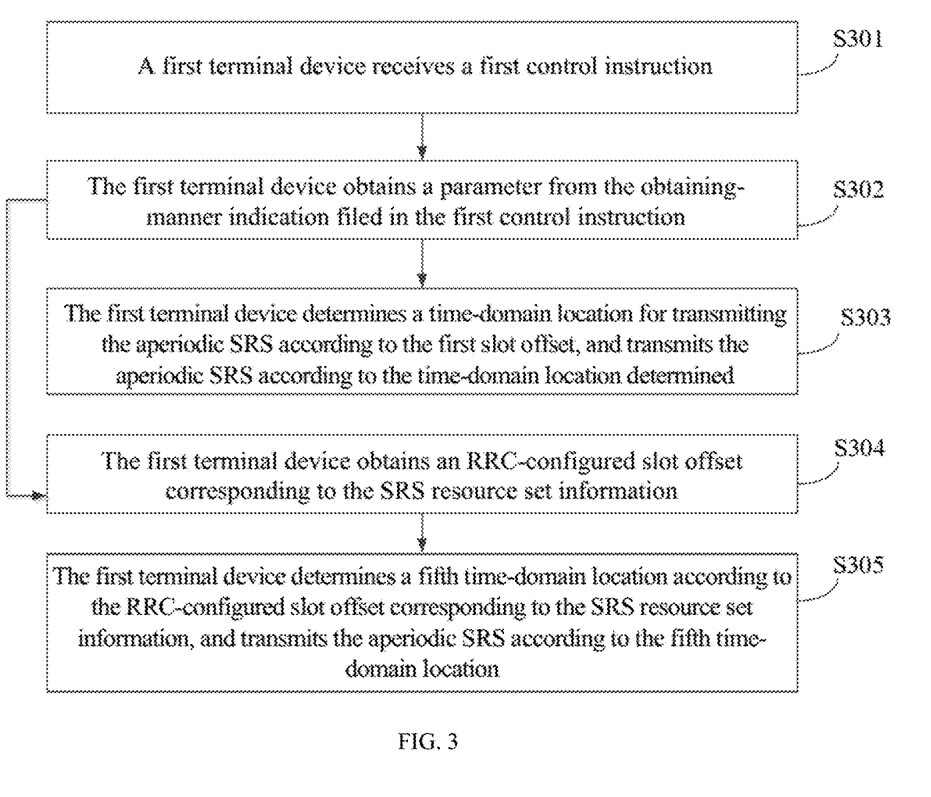
FIG. 3 is a schematic flowchart of another method for transmitting an aperiodic SRS provided in implementations of the disclosure.

Referring to FIG. 3, FIG. 3 is a schematic flowchart of another method for transmitting an aperiodic SRS provided in implementations of the disclosure. As illustrated, the method includes operations at S301-S305.

At S301, a first terminal device receives a first control instruction.

The first control instruction is used for triggering the first terminal device to transmit an aperiodic SRS. The first control instruction contains a first parameter field and SRS resource set information. The first parameter field contains a first slot offset. The first control instruction herein may implicitly indicate the slot offset for the first terminal device to transmit the aperiodic SRS. In this case, the first parameter field may be a TDRA field.

The first control instruction further contains an obtaining-manner indication filed, where the obtaining-manner indication filed contains first obtaining-manner information or second obtaining-manner information. The first obtaining-manner information instructs the first terminal to obtain a slot offset from the first parameter field, and the second obtaining-manner information instructs the first terminal device to obtain a slot offset from a RRC configuration parameter.

At S302, the first terminal device obtains a parameter from the obtaining-manner indication filed in the first control instruction.

A parameter in the obtaining-manner indication filed may be the first obtaining-manner information or the second obtaining-manner information. If the parameter is the first obtaining-manner information, S303 is performed. If the parameter is the second obtaining-manner information, S304 is performed. Optionally, the obtaining-manner indication filed may include one bit, where different values of the bit indicates different parameters. For example, it may be pre-configured that the value of "0" corresponds to the first obtaining-manner information, and the value of "1" corresponds to the second obtaining-manner information. If the obtaining-manner indication filed in the first control instruction has a value of "0", S303 is performed; and if the obtaining-manner indication filed in the first control instruction has a value of "1", S304 is performed.

At S303, the first terminal device determines a time-domain location for transmitting the aperiodic SRS according to the first slot offset, and transmits the aperiodic SRS according to the time-domain location determined.

The SRS resource set information contained in the first control instruction may be the SRS resource set information corresponding to one SRS resource set, or may contain the SRS resource set information corresponding to multiple SRS resource sets. For the specific implementation, reference may be made to the specific implementations of S202 in the corresponding description of FIG. 2, which will not be repeated herein.

At S304, the first terminal device obtains an RRC-configured slot offset corresponding to the SRS resource set information.

Before S301, different SRS resource parameters may be configured through RRC to define different SRS resource sets. In one implementation, a fixed slot offset may be configured through RRC for each SRS resource set (that is, RRC-configured slot offset). The access network device may configure the SRS resource parameter corresponding to the SRS resource set to the first terminal device for storing. The access network device may establish a correspondence between respective SRS resource sets and different aperiodic SRS-Resource Trigger values, and configure the correspondence to the first terminal device, such that the first terminal device can store the aperiodic SRS-Resource Trigger value corresponding to each SRS resource set. Then at S304, after obtaining an SRS request value contained in the first control instruction (i.e. SRS resource set information), the first terminal device determines an aperiodic SRS-Resource Trigger value corresponding to the SRS request value in the first control instruction, and determines a corresponding SRS resource set corresponding to the SRS resource set information in the first control instruction according to the correspondence stored. The first terminal device may further obtain the corresponding SRS resource parameter which is subsequently used for transmitting the aperiodic SRS.

At S305, the first terminal device determines a fifth time-domain location according to the RRC-configured slot offset corresponding to the SRS resource set information, and transmits the aperiodic SRS according to the fifth time-domain location.

Here, the RRC-configured slot offset is a fixed slot offset configured for the SRS resource set corresponding to the SRS resource set information, and the fifth time-domain location is the time-domain location determined according to the slot offset, for the first terminal device to transmit the aperiodic SRS. Specifically, if the first terminal device receives the first control instruction in slot m, and the RRC-configured slot offset corresponding to the SRS resource set information is h, the first terminal device determines to transmit the aperiodic SRS in slot m+h, where slot m+h is the slot for transmitting the SRS. Then according to a symbol location in the SRS resource parameter corresponding to the SRS resource set information, the first terminal device determine a symbol(s) for transmitting the aperiodic SRS in slot m+h (that is, the fifth time-domain location for transmitting the aperiodic SRS). The symbol location refers to a location of a symbol(s) for transmitting the aperiodic SRS (that is, the time-domain location for transmitting the aperiodic SRS) in a slot (the slot for transmitting the aperiodic SRS) which is configured when the SRS resource is configured through RRC. Optionally, the symbol location may be 1 consecutive symbols in last j symbols in the slot for transmitting the aperiodic SRS. For example, in NR, j may have a value of 6, and 1 may have a value of 1, 2, or 4. According to such symbol location, the symbol for transmitting the aperiodic SRS in slot m+h can be determined. In addition, the first terminal device obtains other SRS resource parameter, such as the number of antenna ports, the number of OFDM symbols, and frequency-domain location, of the SRS resource set corresponding to the SRS resource set information in the first control instruction, and transmits the aperiodic SRS on the corresponding symbols in slot m+h according to the SRS resource parameters.

The SRS resource set information contained in the first control instruction may include SRS resource set information corresponding to one SRS resource set, or may include SRS resource set information corresponding to multiple SRS resource sets.

In a first optional implementation, if the SRS resource set information in the first control instruction contains SRS resource set information corresponding to only one first SRS resource set, the first terminal device determines a fifth time-domain location according the RRC-configured slot offset corresponding to the SRS resource set, as instructed by second obtaining-manner information in the obtaining-manner indication field (that is, instructing the first terminal device to obtain the slot offset from the RRC configuration parameter), and transmits the aperiodic SRS on the fifth time-domain location. Here, the first control instruction may be transmitted from the access network device to the first terminal device on condition that multiple SRS resource sets are unexpected or not allowed to be triggered simultaneously for the first terminal device, or on condition that multiple SRS resource sets are expected or allowed to be triggered simultaneously for the first terminal device, but the access network device only requires the first terminal device to transmit the aperiodic SRS based on one first SRS resource set.

In a second optional implementation, the SRS resource set information in the first control instruction includes multiple pieces of SRS resource set information each corresponding to one of multiple SRS resource sets. In this case, the first terminal device may ignore the slot offset indicated by the first control instruction and transmits the aperiodic SRS directly according to an RRC-configured slot offset corresponding to each SRS resource set information. Therefore, for each of the multiple SRS resource sets, the first terminal device obtains an RRC-configured slot offset corresponding to the SRS resource set according to the SRS resource set information, determines the fifth time-domain location corresponding to the SRS resource set according to the RRC-configured slot offset corresponding to the SRS resource set, and transmits the aperiodic SRS at the fifth time-domain location according to the SRS resource parameter(s) corresponding to the SRS resource set.

In a third optional implementation, if the SRS resource set information in the first control instruction includes multiple pieces of SRS resource set information each corresponding to one of multiple SRS resource sets, the first terminal device may select a specified SRS resource set from the multiple SRS resource sets according to second obtaining-manner information in the obtaining-manner indication field (that is, instructing the first terminal device to obtain the slot offset from the RRC configuration parameter), determines the fifth time-domain location for transmitting the aperiodic SRS based on the specified SRS resource set according to the RRC-configured slot offset corresponding to the specified SRS resource set, and transmits the aperiodic SRS on the fifth time-domain location according to the SRS resource set parameter(s) corresponding to the specified SRS resource set. The specified SRS resource set may be determined in various manners. For example, an SRS resource set with a minimum resource-set-identifier (ID) in the multiple SRS resource sets is determined as the specified SRS resource set. For another example, an SRS resource set with a maximum resource-set-ID in the multiple SRS resource sets is determined as the specified SRS resource set. Optionally, multiple specified SRS resource sets may be determined, and the slot offset for transmitting the aperiodic SRS may be determined according to the second obtaining-manner information in the obtaining-manner indication field. The specified SRS resource set may be determined in various manners, which are not limited herein. However, regardless of the specific determination manners, each terminal device within coverage of the access network device shall determine the specified SRS resource set in a same agreed determination manner.

In connection with the third optional implementation, further optionally, the first terminal device would not transmit the aperiodic SRS based on other SRS resource sets than the specified SRS resource set.

In connection with the third optional implementation, further optionally, the first terminal device would also transmit the aperiodic SRS based on other SRS resource sets in addition to the specified SRS resource set. Specifically, for each of the multiple SRS resource sets other than the specified SRS resource set, the first terminal device may obtain an RRC-configured slot offset corresponding to the SRS resource set, determine a transmission slot corresponding to the SRS resource set according to the RRC-configured slot offset corresponding to the SRS resource set, and transmits the aperiodic SRS according to the corresponding transmission slot based on the SRS resource set.

In a fourth optional implementation, the SRS resource set information in the first control instruction includes multiple pieces of SRS resource set information each corresponding to one of multiple SRS resource sets. The first terminal device may ignore the first control instruction and do not transmit the aperiodic SRS based on any SRS resource set.

In a fifth optional implementation, the first control instruction may be transmitted from the access network device to the first terminal device on condition that triggering of multiple SRS resource sets is not expected by or not allowed for the first terminal, while the SRS resource set information in the first control instruction contains multiple pieces of SRS resource set information each corresponding to one of multiple SRS resource sets. In this case, the first terminal determines that an error event occurs and do not transmit the aperiodic SRS.

It should be noted that, for the second optional implementation, the third optional implementation (including further optional implementations in connection with the third optional implementation), the fourth optional implementation, and the fifth optional implementation, the first control instruction contains multiple pieces of SRS resource set information, and the first terminal device may operate in a pre-configured mode (that is, the pre-configured mode is one of the second optional implementation, the third optional implementation, the fourth optional implementation, or the fifth optional implementation). In another possible implementation, the first control instruction may further contain fourth enabling information for instructing the first terminal device to operate in which mode on condition that the first control instruction contains multiple pieces of SRS resource set information, so that the first terminal device may operate in the mode as instructed by the fourth enabling information. Optionally, the fourth enabling information may be the same enabling information as the first, second, or third enabling information.

In implementations of the disclosure, the first terminal device receives a first control instruction for triggering the first terminal device to transmit the aperiodic SRS. The first control instruction contains an obtaining-manner indication field. In a case that the obtaining-manner indication field contains first obtaining-manner information, the aperiodic SRS is transmitted according to a slot offset implicitly indicated in the first control instruction. In a case that the obtaining-manner indication field contains second obtaining-manner information, the aperiodic SRS is transmitted according a slot offset configured through RRC. In this way, the slot offset for transmitting the aperiodic SRS may be indicated dynamically, which improves the flexibility and diversity of determining the transmission slot for the aperiodic SRS.

Figure 4:
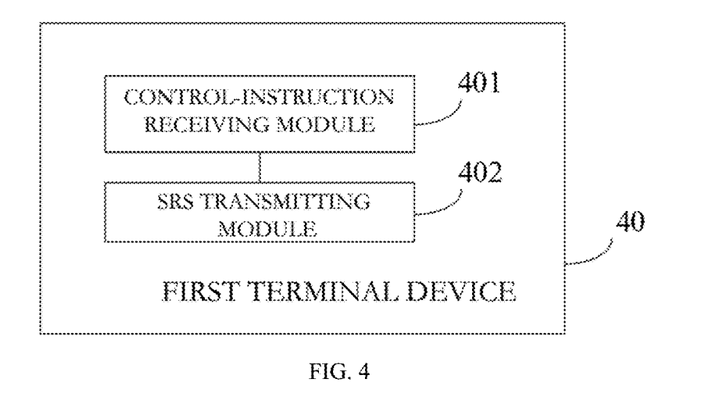
FIG. 4 is a schematic structural diagram of a first terminal device provided in implementations of the disclosure.

Referring to FIG. 4, FIG. 4 is a schematic structural diagram of a first terminal device provided in implementations of the disclosure. As illustrated, the first terminal device 40 includes a control-instruction receiving module 401 and an SRS transmitting module 402.

The control-instruction receiving module 401 is configured to receive a first control instruction for triggering the first terminal device to transmit an aperiodic SRS, the first control instruction containing a first parameter field and SRS resource set information, the first parameter field containing a first slot offset.

The SRS transmitting module 402 is configured to determine a time-domain location for transmitting the aperiodic SRS according to the first slot offset, and transmit the aperiodic SRS according to the time-domain location determined.

In specific implementations, the first terminal device can perform each operation in the method for transmitting an aperiodic SRS as shown in FIG. 2-FIG. 3 through its built-in functional modules. For the specific implementation details, reference may be made to the implementation details of each operation in the corresponding description of FIG. 2-FIG. 3, which will not be repeated herein.

In implementations of the disclosure, the control-instruction receiving module receives a first control instruction for triggering the first terminal device to transmit the aperiodic SRS. The first control instruction contains a first parameter field and SRS resource set information, and the first parameter field contains a first slot offset. The SRS transmitting module determines a time-domain location for transmitting the aperiodic SRS according to the first slot offset, and transmits the aperiodic SRS according to the time-domain location determined. Through the first slot offset carried in the first control instruction, the time slot offset for the first terminal device to transmit the aperiodic SRS can be dynamically indicated, and then the time-domain location for transmitting the aperiodic SRS can be determined according to the dynamically-indicated slot offset, which improves the flexibility and diversity of determining the transmission slot for the aperiodic SRS.

Figure 5:
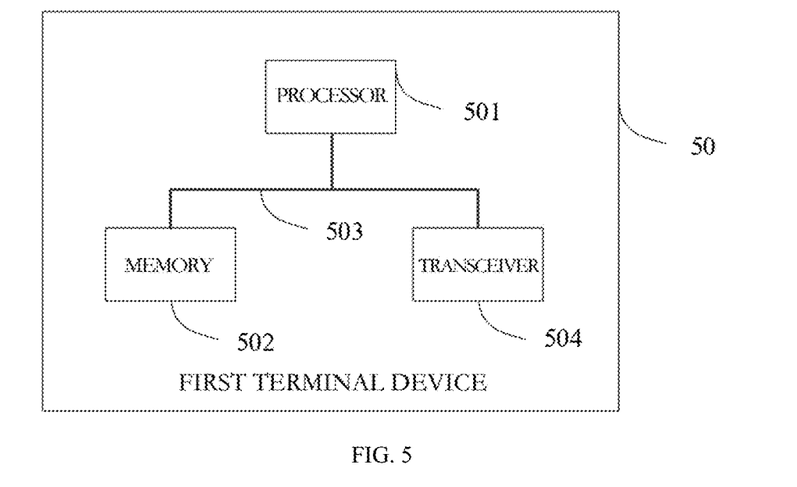
FIG. 5 is a schematic structural diagram of another first terminal device provided in implementations of the disclosure.

The first terminal device in the implementation shown in FIG. 4 may be implemented as a first terminal device 50 shown in FIG. 5. As shown in FIG. 5, FIG. 5 is a structural diagram of another first terminal device provided in implementations of the disclosure. A computing node device 50 shown in FIG. 5 includes a processor 501 and a memory 502.

The processor 501 may be operable to determine a slot offset for transmitting an aperiodic SRS. For example, operations at S201 and the like in the implementation shown in FIG. 2 are implemented.

The memory 502 is operable to store program codes and data for the first terminal device to execute. The processor 501 may execute the application program codes stored in the memory 502 to implement actions provided in any of the implementations shown in FIGS. 2-3.

The processor 501 is communicatively coupled to the memory 502, for example, via a bus 503. The bus 503 may be a PCI bus, an EISA bus, or the like. The bus 503 may include an address bus, a data bus, a control bus, and the like. For ease of representation, only one thick line is shown in FIG. 5, but it does not mean that there is only one bus or one type of bus.

The computing node device 50 may also include a transceiver 504 for supporting information transmission between the first terminal device 50 and the access network device involved in above implementations. For example, operations at S202 in corresponding implementations of FIG. 2, operations at S305 in implementations corresponding to FIG. 3, or the like, may be implemented by the transceiver 504.

It should be noted that in practical applications, the first terminal device may include one or more processors, and the structure of the first terminal device 50 does not constitute a limitation on the implementations of the disclosure.

The processor 501 may be a central processing unit (CPU), a general-purpose processor, a digital signal processor (DSP), an application specific integrated circuit (ASIC), a field programmable gate array (FPGA), or other programmable logic devices, transistor logic devices, hardware components, or any combination thereof. The processor 501 may implement or execute various exemplary logic blocks, modules, and circuits described in connection with the present disclosure. The processor can also be a combination of computing functions, such as a combination of one or more microprocessors, a combination of DSP and microprocessor, etc.

The transceiver 504 may be a communication interface, a transceiver circuit or the like, where the transceiver is collectively referred to, and in a specific implementation, the transceiver may include multiple interfaces.

The memory 502 may include volatile memory, such as random access memory (RAM). The memory 502 may also include non-volatile memory, such as read-only memory (ROM), flash memory, hard disk drive (HDD) or solid state drive (SSD). The memory 502 may also include a combination of the types of memories described above.

In implementations of the disclosure, there is also provided a computer storage medium, which can be used to store the computer software instructions used by the first terminal device in implementations shown in FIG. 5. The computer storage medium including a program designed for the control node device in the above implementations. The storage medium includes but is not limited to flash memory, hard disk and solid state disk.

In implementations of the disclosure, there is also provided a computer program product. When the computer product is run by the first terminal device, it can execute the method for transmitting an aperiodic SRS designed for the first terminal device in the implementations shown in FIG. 4 above.

Figure 6:
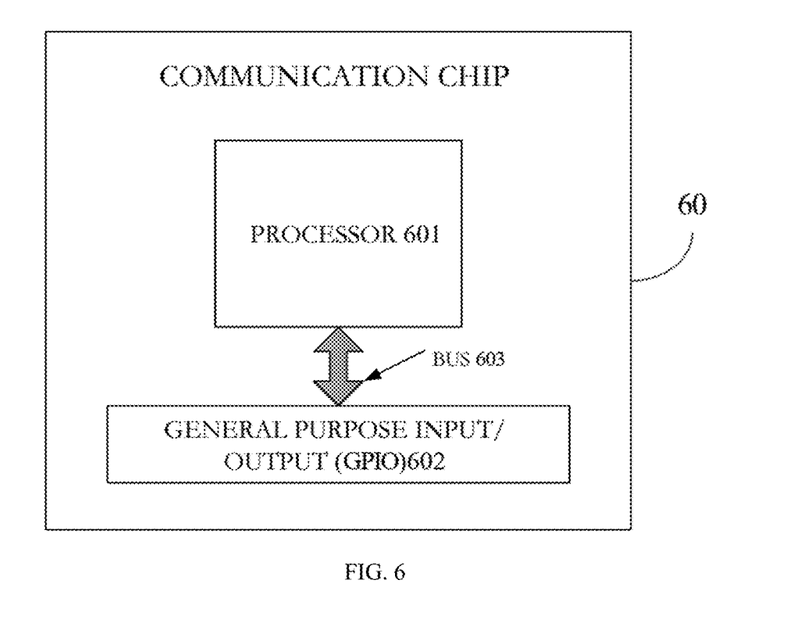
FIG. 6 is a schematic structural diagram of a communication chip provided in implementations of the disclosure.

Referring to FIG. 6, FIG. 6 is a schematic structural diagram of a communication chip provided in implementations of the disclosure. As shown in FIG. 6, the communication chip 60 may include a processor 601 and one or more interfaces 602 coupled to the processor 601.

The processor 601 may be operable to read and execute computer-readable instructions. In a specific implementation, the processor 601 may mainly include a controller, an arithmetic unit, and a register. The controller is mainly responsible for instruction decoding and sending control signals for the operation corresponding to the instructions. The arithmetic unit is mainly responsible for performing fixed-point or floating-point arithmetic operations, shift operations and logic operations, as well as address operations and conversion. The register is mainly responsible for storing register operands and intermediate operation results temporarily stored during instruction execution. In a specific implementation, a hardware architecture of processor 601 can be application specific integrated circuits (ASIC) architecture, MIPs architecture, arm architecture or NP architecture, etc. The processor 601 may have single core or multi cores.

The interface 602 may be configured to input data to be processed to the processor 601, and may output processing results of the processor 601 to external. For example, the interface 602 may be a general purpose input/output (GPIO) interface and may be connected to multiple peripheral devices (such as a display (LCD), a camera, a radio frequency (RF) module, and the like). The interface 602 is connected to the processor 601 via a bus 603.

In the present disclosure, the processor 601 may be configured to call the program for implementing the method for transmitting an aperiodic SRS provided in one or more implementations of the present disclosure from the memory and execute the instructions contained in the program. The interface 602 may be configured to output an execution result of the processor 601. In the present disclosure, the interface 602 may be specifically configured to output a determination result, for the slot offset for transmitting the aperiodic SRS, of the processor 601. The method for transmitting the aperiodic SRS provided in one or more implementations of the present disclosure can refer to the implementations shown in FIG. 2 to FIG. 3, and will not be repeated herein.

It should be noted that the corresponding functions of the processor 601 and the interface 602 can be realized through hardware design, software design, or a combination of software and hardware, which will not be limited herein.

The terms "first", "second", "third", "fourth" or the like in the description and claims of the disclosure and the drawings are used to distinguish different objects, not to describe a specific order, nor do they represent a special limitation on the number of devices in the implementations of the disclosure, and do not constitute any limitation on the implementations of the disclosure. In addition, the terms "include", "have" and any variations thereof are intended to cover non-exclusive inclusions. For example, a process, method, system, product or device that includes a series of operations or units is not limited to the listed operations or units, but optionally also includes the operations or units that are not listed, or optionally includes other operations or units that are fixed to these processes, methods, products or devices.

Those skilled in the art can understand that in various implementations of the disclosure, the sequence number of the above processes does not mean the sequence of execution. The sequence of execution of each process should be determined by its function and internal logic, and should not constitute any limitation on the implementation process of the disclosure.

This disclosure provides a method for transmitting an aperiodic SRS and related devices, which can improve the flexibility and diversity of determining a transmission slot of the aperiodic SRS.

In a first aspect, implementations of the disclosure provide a method for transmitting an aperiodic SRS. The method includes: receiving, by a first terminal device, a first control instruction for triggering the first terminal device to transmit the aperiodic SRS, the first control instruction containing a first parameter field and SRS resource set information, the first parameter field containing a first slot offset; and determining, by the first terminal device, a time-domain location for transmitting the aperiodic SRS according to the first slot offset, and transmitting the aperiodic SRS according to the time-domain location determined.

In a first possible implementation in connection with the first aspect, the SRS resource set information contained in the first control instruction includes only first SRS resource set information corresponding to one first SRS resource set. The determining, by the first terminal device, the time-domain location for transmitting the aperiodic SRS according to the first slot offset, and transmitting the aperiodic SRS according to the time-domain location determined includes: determining, by the first terminal device, a first time-domain location according to the first slot offset, and transmitting the aperiodic SRS according to the first time-domain location based on the first SRS resource set.

In a second possible implementation in connection with the first aspect, the SRS resource set information contained in the first control instruction includes multiple pieces of second SRS resource set information each corresponding to one of multiple second SRS resource sets. The method further includes: for each of the multiple second SRS resource sets: obtaining, by the first terminal device, a radio resource control (RRC)-configured slot offset corresponding to the second SRS resource set according to the second SRS resource set information; determining, by the first terminal device, a second time-domain location corresponding to the second SRS resource set according to the RRC-configured slot offset corresponding to the second SRS resource set; and transmitting, by the first terminal device, the aperiodic SRS according to the second time-domain location based on the second SRS resource set.

In a third possible implementation in connection with the first possible implementation, the SRS resource set information contained in the first control instruction includes multiple pieces of third SRS resource set information each corresponding to one of multiple third SRS resource sets. The determining, by the first terminal device, the time-domain location for transmitting the aperiodic SRS according to the first slot offset, and transmitting the aperiodic SRS according to the time-domain location determined comprises: obtaining, by the first terminal device, a specified third SRS resource set from the multiple third SRS resource sets; and determining, by the first terminal device, a third time-domain location according to the first slot offset, and transmitting the aperiodic SRS according to the third time-domain location based on the specified third SRS resource set.

In a fourth possible implementation in connection with the third possible implementation of the first aspect, the method further includes: for each of the plurality of third SRS resource sets other than the specified third SRS resource set: obtaining, by the first terminal device, a RRC-configured slot offset corresponding to the third SRS resource set according to the third SRS resource set information; determining, by the first terminal device, a fourth time-domain location corresponding to the third SRS resource set according to the RRC-configured slot offset corresponding to the third SRS resource set; and transmitting, by the first terminal device, the aperiodic SRS according to the fourth time-domain location based on the third SRS resource set.

In a fifth possible implementation in connection with the first aspect, the first control instruction further contains an obtaining-manner indication filed, the obtaining-manner indication filed containing first obtaining-manner information or second obtaining-manner information, where the first obtaining-manner information instructs the first terminal to obtain a slot offset from the first parameter field, and the second obtaining-manner information instructs the first terminal device to obtain a slot offset from a RRC configuration parameter. The determining, by the first terminal device, the time-domain location for transmitting the aperiodic SRS according to the first slot offset, and transmitting the aperiodic SRS according to the time-domain location determined includes: determining, by the first terminal device, the time-domain location for transmitting the aperiodic SRS according to the first slot offset, and transmitting the aperiodic SRS according to the time-domain location determined, on condition that the obtaining-manner indication filed contains the first obtaining-manner information. The method further includes: obtaining, by the first terminal device, a RRC-configured slot offset corresponding to the SRS resource set information, on condition that the obtaining-manner indication filed contains the second obtaining-manner information; and determining, by the first terminal device, a fifth time-domain location according to the RRC-configured slot offset corresponding to the SRS resource set information, and transmitting the aperiodic SRS according to the fifth time-domain location.

In a sixth possible implementation in connection with the first aspect, the method further includes: receiving, by the first terminal device, first enabling information, the first enabling information instructing the first terminal device to determine a time-domain location for transmitting the aperiodic SRS according to a first slot offset in the first parameter field. The determining, by the first terminal device, the time-domain location for transmitting the aperiodic SRS according to the first slot offset, and transmitting the aperiodic SRS according to the time-domain location determined includes: obtaining, by the first terminal device, the first slot offset from the first parameter field according to the first enabling information; determining the time-domain location for transmitting the aperiodic SRS according to the first slot offset; and transmitting the aperiodic SRS according to the time-domain location determined.

In a seventh possible implementation in connection with the first aspect, the method further includes: receiving, by the first terminal device, second enabling information for instructing the first terminal device to determine a time-domain location for transmitting the aperiodic SRS according to a RRC-configured slot offset; receiving, by the first terminal device, second control instruction for triggering the first user terminal to transmit the aperiodic SRS, the second control instruction containing fourth SRS resource set information; obtaining, by the first terminal device, a RRC-configured slot offset corresponding to the fourth SRS resource set information according to the second enabling information; and determining a sixth time-domain location according to the RRC-configured slot offset corresponding to the fourth SRS resource set information, and transmitting the aperiodic SRS according to the sixth time-domain location.

In a second aspect, implementations of the disclosure provide a first terminal device. The first terminal device includes: a control-instruction receiving module configured to receive a first control instruction for triggering the first terminal device to transmit an aperiodic SRS, the first control instruction containing a first parameter field and SRS resource set information, the first parameter field containing a first slot offset; and an SRS transmitting module configured to determine a time-domain location for transmitting the aperiodic SRS according to the first slot offset, and transmit the aperiodic SRS according to the time-domain location determined.

In a third aspect, implementations of the disclosure provide a first terminal device. The communication apparatus may include a processor and a memory. The processor is coupled with the memory. The memory is configured to store program codes. The processor is configured to execute the program codes stored in the memory to perform the method in the first aspect or implementations thereof.

In a fourth aspect, implementations of the disclosure provide a computer storage medium. The computer storage medium stores a computer program. The computer program is executable by a processor to perform the method of any aspect above.

In a fifth aspect, implementations of the disclosure provide a communication chip. The communication chip may include a processor and one or more interfaces coupled with the processor. The processor may be configured to invoke a program for implementing the method for determining a transmission resource provided in any of the above aspects from the memory, and execute instructions contained in the program. The interfaces may be configured to output a result of determining the transmission resource from the processor.

In a sixth aspect, implementations of the disclosure provide a computer program product including instructions which, when executed on a processor, cause the processor to perform the method for determining a transmission resource described in any aspect above.

In implementations of the disclosure, the first terminal device receives a first control instruction for triggering the first terminal device to transmit an aperiodic SRS. The first control instruction contains a first parameter field and SRS resource set information, and the first parameter field contains a first slot offset. The first terminal device determines a time-domain location for transmitting the aperiodic SRS according to the first slot offset, and transmits the aperiodic SRS according to the time-domain location determined. Through the first slot offset carried in the first control instruction, the slot offset for the first terminal device to transmit the aperiodic SRS can be dynamically indicated, and then the time-domain location for transmitting the aperiodic SRS can be determined according to the dynamically-indicated slot offset, which improves the flexibility and diversity of determining the transmission slot for the aperiodic SRS.

What is claimed is:

1. A method for transmitting an aperiodic sounding reference signal (SRS), comprising:

receiving, by a terminal device, a first control instruction for triggering the terminal device to transmit the aperiodic SRS, the first control instruction containing a first parameter field and SRS resource set information, the first parameter field containing a first slot offset; and determining, by the terminal device, a time-domain location for transmitting the aperiodic SRS according to the first slot offset, and transmitting the aperiodic SRS according to the time-domain location determined, wherein the SRS resource set information contained in the first control instruction comprises multiple pieces of third SRS resource set information each corresponding to one of a plurality of third SRS resource sets, determining, by the terminal device, the time-domain location for transmitting the aperiodic SRS according to the first slot offset, and transmitting the aperiodic SRS according to the time-domain location determined comprise:

determining, by the terminal device, a specified third SRS resource set from the plurality of third SRS resource sets; and determining, by the terminal device, a third time-domain location according to the first slot offset, and transmitting the aperiodic SRS according to the third time-domain location based on the specified third SRS resource set, and the method further comprises:

for each of the plurality of third SRS resource sets other than the specified third SRS resource set:

obtaining, by the terminal device, a RRC-configured slot offset corresponding to the third SRS resource set according to the third SRS resource set information;

determining, by the terminal device, a fourth time-domain location corresponding to the third SRS resource set according to the RRC-configured slot offset corresponding to the third SRS resource set; and transmitting, by the terminal device, the aperiodic SRS according to the fourth time-domain location based on the third SRS resource set.

2. The method of claim 1, wherein the SRS resource set information contained in the first control instruction comprises only first SRS resource set information corresponding to one first SRS resource set; and determining, by the terminal device, the time-domain location for transmitting the aperiodic SRS according to the first slot offset, and transmitting the aperiodic SRS according to the time-domain location determined further comprises:

determining, by the terminal device, a first time-domain location according to the first slot offset, and transmitting the aperiodic SRS according to the first time-domain location based on the first SRS resource set.

3. The method of claim 1, wherein the SRS resource set information contained in the first control instruction comprises multiple pieces of second SRS resource set information each corresponding to one of a plurality of second SRS resource sets; and the method further comprises:

for each of the plurality of second SRS resource sets:

obtaining, by the terminal device, a radio resource control (RRC)-configured slot offset corresponding to the second SRS resource set according to the second SRS resource set information;

determining, by the terminal device, a second time-domain location corresponding to the second SRS resource set according to the RRC-configured slot offset corresponding to the second SRS resource set; and transmitting, by the terminal device, the aperiodic SRS according to the second time-domain location based on the second SRS resource set.

4. The method of claim 1, wherein the first control instruction further contains an obtaining-manner indication filed, the obtaining-manner indication filed containing first obtaining-manner information or second obtaining-manner information, wherein the first obtaining-manner information instructs the terminal to obtain a slot offset from the first parameter field, and the second obtaining-manner information instructs the terminal device to obtain a slot offset from a RRC configuration parameter;

determining, by the terminal device, the time-domain location for transmitting the aperiodic SRS according to the first slot offset, and transmitting the aperiodic SRS according to the time-domain location determined further comprises:

determining, by the terminal device, the time-domain location for transmitting the aperiodic SRS according to the first slot offset, and transmitting the aperiodic SRS according to the time-domain location determined, on condition that the obtaining-manner indication filed contains the first obtaining-manner information; and the method further comprises:

obtaining, by the terminal device, a RRC-configured slot offset corresponding to the SRS resource set information, on condition that the obtaining-manner indication filed contains the second obtaining-manner information; and determining, by the terminal device, a fifth time-domain location according to the RRC-configured slot offset corresponding to the SRS resource set information, and transmitting the aperiodic SRS according to the fifth time-domain location.

5. The method of claim 1, further comprising:

receiving, by the terminal device, first enabling information, wherein the first enabling information instructs the terminal device to determine a time-domain location for transmitting the aperiodic SRS according to a first slot offset in the first parameter field; and determining, by the terminal device, the time-domain location for transmitting the aperiodic SRS according to the first slot offset, and transmitting the aperiodic SRS according to the time-domain location determined comprises:

obtaining, by the terminal device, the first slot offset from the first parameter field according to the first enabling information;

determining the time-domain location for transmitting the aperiodic SRS according to the first slot offset; and transmitting the aperiodic SRS according to the time-domain location determined.

6. The method of claim 1, further comprising:
receiving, by the terminal device, second enabling information for instructing the terminal device to determine a time-domain location for transmitting the aperiodic SRS according to a RRC-configured slot offset;
receiving, by the terminal device, a second control instruction for triggering the terminal device to transmit the aperiodic SRS, the second control instruction containing fourth SRS resource set information;
obtaining, by the terminal device, a RRC-configured slot offset corresponding to the fourth SRS resource set information according to the second enabling information; and
determining a sixth time-domain location according to the RRC-configured slot offset corresponding to the fourth SRS resource set information, and transmitting the aperiodic SRS according to the sixth time-domain location.

7. A terminal device, comprising:
a transceiver;
a memory for storing program codes; and
a processor coupled with the memory and the transceiver, wherein the terminal device is configured to invoke the program codes to:
receive, with the transceiver, a first control instruction for triggering the terminal device to transmit the aperiodic SRS, the first control instruction containing a first parameter field and SRS resource set information, the first parameter field containing a first slot offset; and
determine, with the processor, a time-domain location for transmitting the aperiodic SRS according to the first slot offset, and transmit, with the transceiver, the aperiodic SRS according to the time-domain location determined,
wherein
the SRS resource set information contained in the first control instruction comprises multiple pieces of third SRS resource set information each corresponding to one of a plurality of third SRS resource sets,
the terminal device configured to determine, with the processor, a time-domain location for transmitting the aperiodic SRS according to the first slot offset, and transmit, with the transceiver, the aperiodic SRS according to the time-domain location determined is configured to:
determine, with the processor, a specified third SRS resource set from the plurality of third SRS resource sets; and
determine, with the processor, a third time-domain location according to the first slot offset, and transmit, with the transceiver, the aperiodic SRS according to the third time-domain location based on the specified third SRS resource set, and
the terminal device is further configured to invoke the program codes to:
for each of the plurality of third SRS resource sets other than the specified third SRS resource set:
obtain, with the processor, a RRC-configured slot offset corresponding to the third SRS resource set according to the third SRS resource set information;
determine, with the processor, a fourth time-domain location corresponding to the third SRS resource set according to the RRC-configured slot offset corresponding to the third SRS resource set; and
transmit, with the transceiver, the aperiodic SRS according to the fourth time-domain location based on the third SRS resource set.

8. A non-transitory computer-readable storage medium storing a computer program, the computer program being executable by a terminal device to cause the terminal device to:
receive a first control instruction for triggering the terminal device to transmit the aperiodic SRS, the first control instruction containing a first parameter field and SRS resource set information, the first parameter field containing a first slot offset; and
determine a time-domain location for transmitting the aperiodic SRS according to the first slot offset, and transmit the aperiodic SRS according to the time-domain location determined,
wherein
the SRS resource set information contained in the first control instruction comprises multiple pieces of third SRS resource set information each corresponding to one of a plurality of third SRS resource sets,
the computer program causing the terminal device to determine the time-domain location for transmitting the aperiodic SRS according to the first slot offset, and transmit the aperiodic SRS according to the time-domain location determined causes the terminal device to:
determine a specified third SRS resource set from the plurality of third SRS resource sets; and
determine a third time-domain location according to the first slot offset, and transmit, with the transceiver, the aperiodic SRS according to the third time-domain location based on the specified third SRS resource set, and
the computer program is executable by the terminal device to further cause the terminal device to:
for each of the plurality of third SRS resource sets other than the specified third SRS resource set:
obtain, with the processor, a RRC-configured slot offset corresponding to the third SRS resource set according to the third SRS resource set information;
determine, with the processor, a fourth time-domain location corresponding to the third SRS resource set according to the RRC-configured slot offset corresponding to the third SRS resource set; and
transmit, with the transceiver, the aperiodic SRS according to the fourth time-domain location based on the third SRS resource set.

9. The terminal device of claim 7, wherein
the SRS resource set information contained in the first control instruction comprises only first SRS resource set information corresponding to one first SRS resource set; and
the terminal device configured to determine the time-domain location for transmitting the aperiodic SRS according to the first slot offset, and transmit the aperiodic SRS according to the time-domain location determined is further configured to:
determine, with the processor, a first time-domain location according to the first slot offset, and transmit, with the transceiver, the aperiodic SRS according to the first time-domain location based on the first SRS resource set.

10. The terminal device of claim 7, wherein
the SRS resource set information contained in the first control instruction comprises multiple pieces of second SRS resource set information each corresponding to one of a plurality of second SRS resource sets; and the terminal device is further configured to invoke the program codes to:

for each of the plurality of second SRS resource sets:

obtain, with the processor, a radio resource control (RRC)-configured slot offset corresponding to the second SRS resource set according to the second SRS resource set information;

determine, with the processor, a second time-domain location corresponding to the second SRS resource set according to the RRC-configured slot offset corresponding to the second SRS resource set; and transmit, with the transceiver, the aperiodic SRS according to the second time-domain location based on the second SRS resource set.

11. The terminal device of claim 7, wherein the first control instruction further contains an obtaining-manner indication filed, the obtaining-manner indication filed containing first obtaining-manner information or second obtaining-manner information, wherein the first obtaining-manner information instructs the terminal to obtain a slot offset from the first parameter field, and the second obtaining-manner information instructs the terminal device to obtain a slot offset from a RRC configuration parameter;

the terminal device configured to determine the time-domain location for transmitting the aperiodic SRS according to the first slot offset, and transmit the aperiodic SRS according to the time-domain location determined is configured to:

determine, with the processor, the time-domain location for transmitting the aperiodic SRS according to the first slot offset, and transmit, with the transceiver, the aperiodic SRS according to the time-domain location determined, on condition that the obtaining-manner indication filed contains the first obtaining-manner information; and the terminal device is further configured to invoke the program codes to:

obtain, with the processor, a RRC-configured slot offset corresponding to the SRS resource set information, on condition that the obtaining-manner indication filed contains the second obtaining-manner information; and determine, with the processor, a fifth time-domain location according to the RRC-configured slot offset corresponding to the SRS resource set information, and transmit, with the transceiver, the aperiodic SRS according to the fifth time-domain location.

12. The terminal device of claim 7, wherein the terminal device is further configured to invoke the program codes to:

receive, with the transceiver, first enabling information, wherein the first enabling information instructs the terminal device to determine a time-domain location for transmitting the aperiodic SRS according to a first slot offset in the first parameter field; and the terminal device configured to determine the time-domain location for transmitting the aperiodic SRS according to the first slot offset, and transmit the aperiodic SRS according to the time-domain location determined is further configured to:

obtain, with the processor, the first slot offset from the first parameter field according to the first enabling information;

determine, with the processor, the time-domain location for transmitting the aperiodic SRS according to the first slot offset; and transmit, with the transceiver, the aperiodic SRS according to the time-domain location determined.

13. The terminal device of claim 7, wherein the terminal device is further configured to invoke the program codes to:

receive, with the transceiver, second enabling information for instructing the terminal device to determine a time-domain location for transmitting the aperiodic SRS according to a RRC-configured slot offset;

receive, with the transceiver, a second control instruction for triggering the terminal device to transmit the aperiodic SRS, the second control instruction containing fourth SRS resource set information;

obtain, with the processor, a RRC-configured slot offset corresponding to the fourth SRS resource set information according to the second enabling information; and determine, with the processor, a sixth time-domain location according to the RRC-configured slot offset corresponding to the fourth SRS resource set information, and transmit, with the transceiver, the aperiodic SRS according to the sixth time-domain location.

14. The non-transitory computer-readable storage medium of claim 8, wherein the SRS resource set information contained in the first control instruction comprises only first SRS resource set information corresponding to one first SRS resource set; and the computer program causing the terminal device to determine the time-domain location for transmitting the aperiodic SRS according to the first slot offset, and transmit the aperiodic SRS according to the time-domain location determined further causes the terminal device to:

determine a first time-domain location according to the first slot offset, and transmit the aperiodic SRS according to the first time-domain location based on the first SRS resource set.

15. The non-transitory computer-readable storage medium of claim 8, wherein the SRS resource set information contained in the first control instruction comprises multiple pieces of second SRS resource set information each corresponding to one of a plurality of second SRS resource sets; and the computer program is executable by the terminal device to further cause the terminal device to:

for each of the plurality of second SRS resource sets:

obtain a radio resource control (RRC)-configured slot offset corresponding to the second SRS resource set according to the second SRS resource set information;

determine a second time-domain location corresponding to the second SRS resource set according to the RRC-configured slot offset corresponding to the second SRS resource set; and transmit the aperiodic SRS according to the second time-domain location based on the second SRS resource set.

* * * * *